(No Model.)
T. J. KING.
SEED DRILL.
No. 596,600. Patented Jan. 4, 1898.
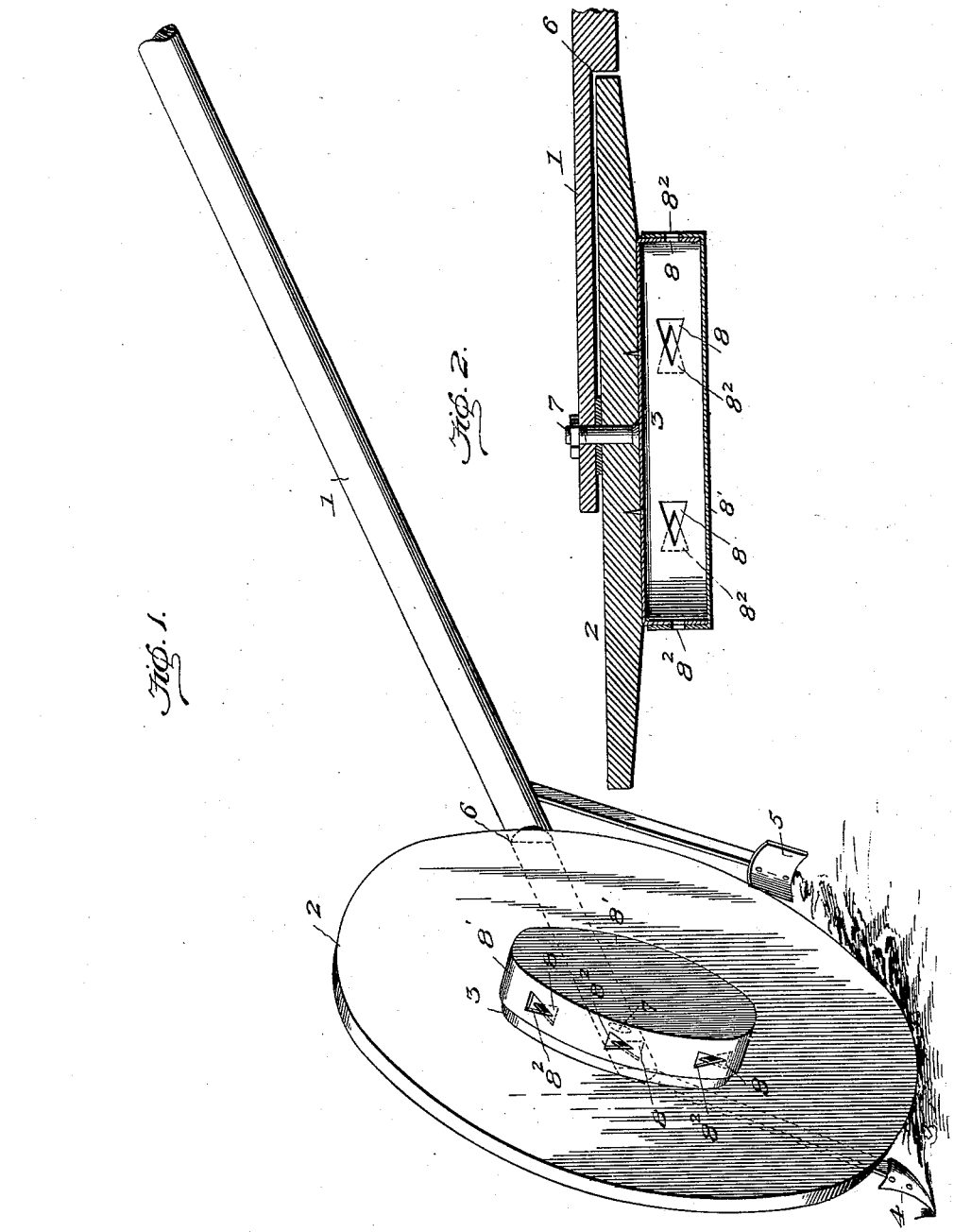
Witnesses
Inventor
Thomas J. King
By H. B. Willson,
Attorney

United States Patent Office.

THOMAS JOEL KING, OF RICHMOND, VIRGINIA.

SEED-DRILL.

SPECIFICATION forming part of Letters Patent No. 596,600, dated January 4, 1898.

Application filed March 30, 1897. Serial No. 629,950. (No model.)

*To all whom it may concern:*

Be it known that I, THOMAS JOEL KING, a citizen of the United States, residing at Richmond, in the county of Henrico and State of Virginia, have invented certain new and useful Improvements in Seed-Drills; and I do declare the following to be a full, clear, and exact description of the invention, such as will enable others skilled in the art to which it appertains to make and use the same.

My invention relates to a seed-drill.

The object of the invention is to provide a device of this character that may be easily pushed along by the operator and which is furnished with means for varying the seed-discharge, so as to regulate the quantity of seed dropped.

With this object in view the invention consists of certain features of construction and combination of parts which will be hereinafter fully described and claimed.

In the accompanying drawings, Figure 1 is a perspective view of my improved seed-drill; and Fig. 2 is a cross-sectional view through the lower end of the handle, the supporting-wheel, and seed-cup.

In the drawings, 1 denotes the operating-handle; 2, the supporting-wheel journaled to its lower end; 3, the seed-cup carried by the supporting-wheel; 4, the furrow-opener secured to the handle in advance of the supporting-wheel, and 5 the furrow-closer secured to the handle and projecting downwardly at the rear of said wheel.

The supporting-wheel lies in a recess 6, formed at the lower end of the handle, and a bolt 7 passes through the wheel and serves as an axis upon which it turns.

The seed-cup is preferably annular in form, and its side is provided with a series of triangular seed-openings 8. The cap or cover 8' of the seed-cup is provided with a corresponding number of registering triangular seed-openings $8^2$, the apices of which project reversely to those in the side of the cup.

In operation the seed are placed in the cup and the cap or cover secured in place, and by turning the same the seed-openings may be varied to suit the character and amount of seed to be drilled. By pushing the drill along a furrow will be opened, the seed dropped, and the furrow closed.

From the foregoing description, taken in connection with the accompanying drawings, the operation and advantages of the invention will be readily understood and appreciated without requiring further explanation.

The device is simple of construction, durable in use, and, being comparatively inexpensive of production, may be placed upon the market at such a small cost as to be within reach of all.

Having thus fully described my invention, what I claim as new and useful, and desire to secure by Letters Patent of the United States, is—

In a seed-drill, the combination with a handle, of a supporting wheel or disk journaled to the lower end thereof, a furrow-opener secured to said handle in advance of the supporting-wheel, a furrow-closer secured to said handle and projecting downwardly at the rear of the wheel, a seed-cup secured to the side of said wheel and provided with a series of triangular openings, and a removable rotatably-adjustable cap or cover having a corresponding number of registering triangular openings in its side, the apices of which are reversed to those of the cup, whereby in the rotary adjustment of the cup the seed-openings will be enlarged or diminished without the necessity of extending said cup laterally, substantially as set forth.

In testimony whereof I hereunto affix my signature in presence of two witnesses.

THOMAS JOEL KING.

Witnesses:
RICHARD W. JONES,
NANNIE J. GALLIAN.